April 16, 1929.  E. J. SHAFFER  1,709,234
SAFETY HOOK
Filed Jan. 14, 1927
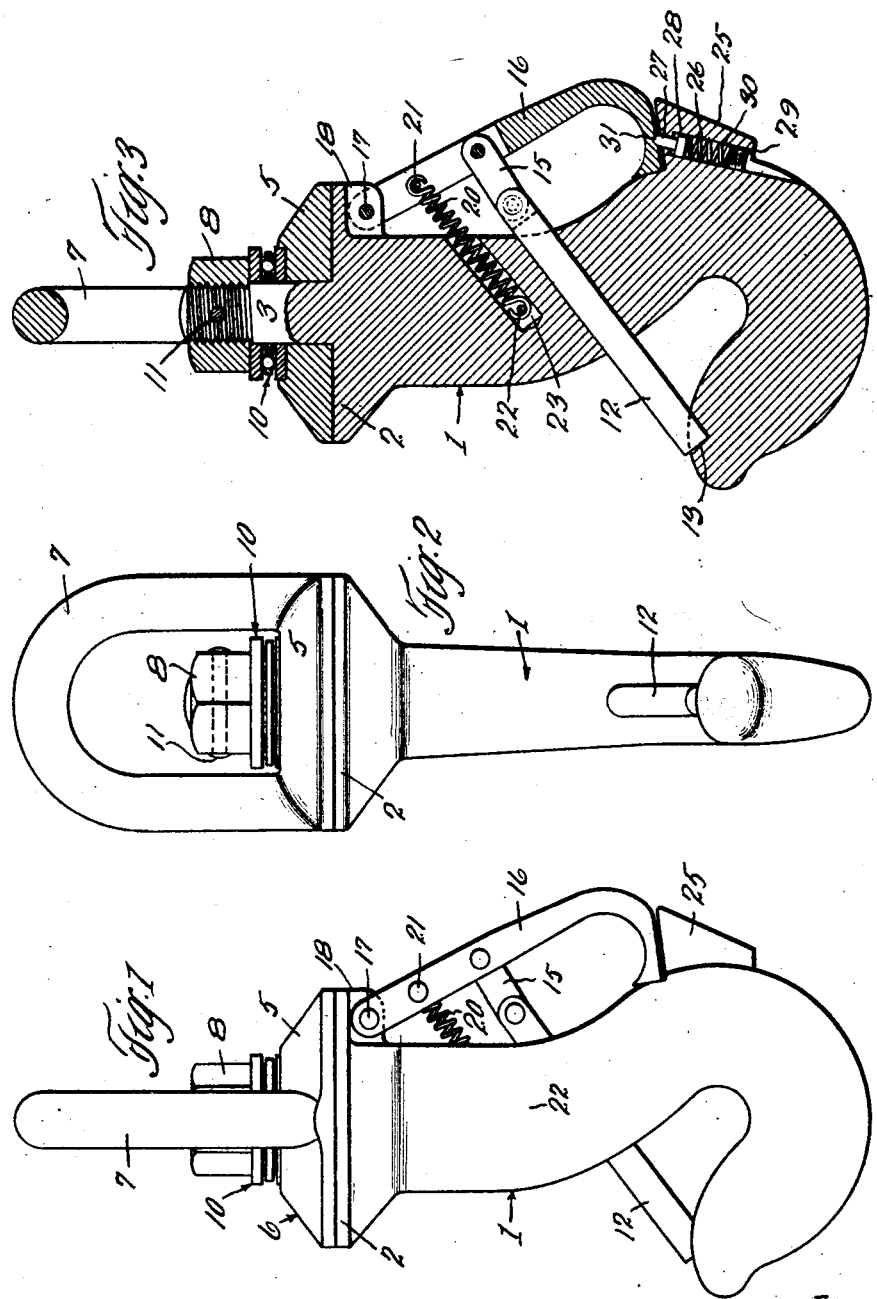

Patented Apr. 16, 1929.

1,709,234

UNITED STATES PATENT OFFICE.

ERNEST J. SHAFFER, OF TULSA, OKLAHOMA.

SAFETY HOOK.

Application filed January 14, 1927. Serial No. 161,219.

This invention pertains to what are known as safety hooks that are used extensively about oil well rigs for connecting the hoisting line to sucker rod elevators, and for other such purposes. The invention has, of course, a wider range of utility, but it is especially suitable, and is designed principally, for such use.

The objects of the invention are to provide a hook of this class that is very strong; that is so designed as to present no corners or angles that are liable to catch on parts of the well rig or other objects when the hook is being raised or lowered; that involves means for preventing the hook from accidentally becoming disengaged from the object that is to be lifted, and for preventing it from likewise becoming caught on objects; that incorporates a latch for holding said means in effective position; and that includes a handle for moving said means to ineffective position and which handle also serves as a means for handling the hook when engaging it with and disengaging it from objects, thus making the actuation of the aforesaid means a part of a natural and very convenient operation.

The foregoing objects with others hereinafter appearing are attained in the embodiment of the invention illustrated in the accompanying drawing wherein Fig. 1 is a side elevation of my improved safety hook; Fig. 2 is a front elevation thereof; and Fig. 3 is a central vertical section through the hook.

The body 1 of the hook is formed with an enlargement 2 at its upper end, which is preferably circular in plan, and rising from the center of this enlargement is a stud 3 that is threaded at its upper end. This stud is freely rotatable within a central aperture of the base portion 5 of a clevis, designated generally 6, which involves a bail 7 for connecting it to a hoisting line by suitable means, such as a C hook, commonly employed for such purpose. A nut 8 is applied to the threaded end of the stud 3, and between said nut and the recessed upper end of the base 5 of the clevis is interposed an anti-friction bearing 10. The nut is locked against turning with respect to the stud by a pin 11 that is extended through holes in the nut and stud.

Slidably mounted in a bore that extends obliquely through the shank of the body 1, so that its axis intersects that of the hook slot, is a locking bolt 12 whose forward end is arranged to engage within a recess 13 in the toe of the hook. The opposite end of the locking bolt is connected, by means of a link 15, to a handle 16 that is pivoted at 17 to a lug 18 formed on the rear side of the enlargement 2. As shown, the handle 16 is bifurcated at its upper end and the lug 18 and the link 15 enter between the side branches of such bifurcated end. A tension spring 20 has one of its ends connected, as by a pin 21, to the handle 16, while its opposite end is fastened to a pin 22 at the bottom of a recess 23 that is formed in the rear face of the body substantially parallel to the bore in which the locking bolt 12 operates. The lower end of the handle 16 is curved inwardly and squared off underneath to form a flat portion that mates with the upper flat face of a boss 25 that projects rearwardly from the heel of the body 1. A bore 26 is formed in the boss 25 and the same is reduced at its upper end, and operating within this reduced portion of the bore is a plunger 27 having a head 28 that has a sliding fit within the bore and between which head, and a plug 29 that is screwed into the lower end of the bore, is confined a compression spring 30 which serves to advance the plunger 27 and engage it with a depression 31 that is formed in the underneath face of the handle 16.

In the use of the hook, assuming that it is suspended from a line connected to the bail of the clevis 6, the operator grasps the handle 16 and swings the hook rearwardly with a lifting action. The weight of the body 1, relative to the tension of the spring 20—and the resistance of the spring pressed plunger 27, causes a disengagement of the handle from the plunger and a swinging of the handle outwardly with respect to the body, thereby to retract the locking bolt 12, which leaves the hook slot open to receive the object wherewith the hook is to be engaged as, for example, the bail of a sucker rod elevator. As soon as the hook is engaged with the object, the handle is released whereupon the spring 20 swings the handle to normal position where it is frictionally held by the plunger 27. Thus the object is locked within the hook, and the handle held in such a position as will prevent its being accidentally swung outwardly which would, of course, cause the withdrawal of the bolt 12 from locking position.

It will be noted that the upper surface of the base 5 of the clevis, and the underneath face of the enlargement 2 of the body, are beveled so as to avoid these parts from catching upon objects as the hook is being raised and lowered; and the receding surfaces of the handle 16 and boss 25 on one side, and of the locking bolt 12 and underneath part of the toe of the body on the other, serve a like purpost of preventing the hook from catching on objects as it is moved vertically or swung about from place to place.

Having thus described my invention, what I claim is:—

1. A device of the character set forth comprising a hook body, suspension means at the upper end of said body, a locking member normally extending downwardly and outwardly from one side of the body across the hook entrance and toward the toe of the hook, a handle exterior of the body and extending downwardly and outwardly from the opposite side of the body, and operative connections between the said member and the handle.

2. A device of the character set forth comprising a hook body, suspension means at the upper end of the body, a locking member normally extending downwardly and outwardly from one side of the body across the hook entrance and toward the toe of the hook, a handle exterior of the body and extending downwardly and outwardly from the opposite side of the body, operative connections between said member and the handle whereby said member may be withdrawn from across the slot by the moving of the handle away from the body, and a spring tending to move the handle toward the body.

3. A device of the character set forth comprising a hook body, suspension means at the upper end of the body, a locking member normally extending downwardly and outwardly from one side of the body across the hook entrance and toward the toe of the hook, a handle exterior of the body and extending downwardly and outwardly from the opposite side of the body, operative connections between said member and the handle whereby said member may be withdrawn from across the slot by the moving of the handle away from the body, and friction means tending to maintain the handle adjacent the body.

4. A device of the character set forth comprising a hook body, suspension means at the upper end of the body, a locking member normally extending from one side of the body across the hook entrance and toward the toe of the hook, a handle disposed on the opposite side of the body, operative connections between said member and the handle whereby said member may be withdrawn from across the entrance by the moving of the handle away from the body, and a latch for maintaining the handle adjacent the body.

5. A device of the character set forth comprising a hook body, suspension means at the upper end of the body, a locking member slidably supported by the body for movement across the hook entrance toward and from the toe of the hook, a handle pivoted to the body on the side thereof opposite the toe, and operative connections between said handle and the locking member.

6. A device of the character set forth comprising a hook body, suspension means at the upper end of the body, a locking member slidably supported by the body for movement across the entrance of the hook, a handle pivoted to the body on the side thereof opposite the slot, operative connections between said handle and the locking member whereby said member may be withdrawn from the entrance by the moving of the handle away from the body, and a latch for maintaining the handle adjacent the body.

7. A device of the character set forth comprising a hook body, suspension means at the upper end of the body, a locking member slidably supported by the body for movement across the entrance of the hook, a handle pivoted to the upper portion of the body on the side thereof opposite the slot, operative connections between said handle and the locking member whereby said member may be withdrawn from the entrance by the moving of the lower end of the handle away from the body, and friction means carried by the body for cooperation with the handle thereby to maintain the lower end of the handle adjacent the body.

8. A device of the character set forth comprising a hook body having a bore therethrough the axis of which intersects that of the hook entrance, a locking bolt slidable in said bore toward and from the toe of the hook, a handle pivoted to the side of the body opposite the toe, a link pivotally connected at one end to the bolt and at the other end to the handle, and a spring tending to swing the handle toward the body thereby to project the bolt across the entrance.

9. A device of the character set forth comprising a hook body having a bore therethrough the axis of which intersects that of the hook entrance, a locking bolt slidable in said bore towards and from the toe of the hook, a handle pivoted to the side of the body opposite the toe, a link pivotally connected at one end to the bolt and at the other end to the handle, and friction means for maintaining the handle adjacent the body.

10. A device of the character set forth comprising a hook body having a bore therethrough the axis of which intersects that of the hook entrance, a locking bolt slidable in said bore toward and from the toe of the hook, a handle pivoted to the side of the body opposite the toe, a link pivotally connected at one end to the bolt and at the other end to the handle, a spring having one of its ends connected to the handle, the body having a recess wherein the opposite end of the spring is housed, and means connecting the latter end of the spring to the body.

11. A device of the character set forth comprising a hook body, suspension means at the upper end of the body, a locking member carried by the body and movable across the hook entrance toward and from the toe of the hook, a handle pivoted to the body on the side thereof opposite the toe, operative connections between the locking member and the handle whereby said member may be withdrawn from the entrance by the moving of the handle away from the body, and means for maintaining the handle adjacent the body, said means comprising a plunger movably carried by the body in a position to engage a part of the handle, and a spring for urging said plunger into engagement with said part.

12. A device of the character set forth comprising a hook body, suspension means at the upper end of said body, a locking member supported by the body for movement toward and from the toe of the hook, a lug located adjacent the upper end of the body on the side thereof opposite the toe, a handle having a bifurcated upper end the side branches of which are disposed on opposite sides of said lug, pivot means extending through said branches and lug, connections between the locking member and said handle involving a part movable with said member and disposed within the bifurcation of the handle, pivot means extending through the handle and through said part, and a spring having one of its ends connected to the body and its opposite end disposed within the bifurcation of the handle, and a pin carried by the handle and to which the latter end of the spring is attached.

In testimony whereof, I hereunto affix my signature.

ERNEST J. SHAFFER.